United States Patent [19]
McIntyre et al.

[11] Patent Number: 5,532,849
[45] Date of Patent: Jul. 2, 1996

[54] FACSIMILE WITH LOCAL CORRECTION OF TRC BASED ON DESTINATION TRC REQUIREMENTS

[75] Inventors: Lloyd F. McIntyre, Plano, Tex.; Reiner Eschbach, Webster, N.Y.

[73] Assignee: Xerox Corporation, Stamford, Conn.

[21] Appl. No.: 402,459

[22] Filed: Mar. 10, 1995

[51] Int. Cl.[6] .................................................. H04N 1/407
[52] U.S. Cl. .......................... 358/534; 358/518; 358/523; 358/436
[58] Field of Search ...................... 358/434–436, 358/401, 501, 504, 518, 520, 523, 534, 456, 455; H04N 1/407

[56] References Cited

U.S. PATENT DOCUMENTS

| | | | |
|---|---|---|---|
| 3,597,071 | 7/1971 | Jones | 355/3 |
| 4,623,244 | 11/1986 | Andrews et al. | 355/24 |
| 4,768,082 | 8/1988 | Hiratsuka et al. | 358/534 |
| 4,811,239 | 7/1989 | Tsao | 358/534 |
| 4,947,345 | 8/1990 | Paradise et al. | 364/519 |
| 5,021,892 | 6/1991 | Kita et al. | 358/468 |
| 5,038,218 | 8/1991 | Matsumoto | 358/296 |
| 5,172,224 | 12/1992 | Collette et al. | 358/406 |
| 5,347,374 | 9/1994 | Fuss et al. | 358/520 |

OTHER PUBLICATIONS

H. Hou, *Digital Document Processing*, John Wiley and Sons, 1983, pp. 100–103.
Recommendation T.30 "Procedures for Document Facsimile Transmission in the General Switched Telephone Network", Melbourne 1988 (ITU).

*Primary Examiner*—Kim Yen Vu
*Attorney, Agent, or Firm*—Mark Costello

[57] ABSTRACT

A multifunction device having at least a facsimile function, a scanner and an image processing circuit is provided. The image processing circuit includes a circuit for applying a TRC correction to gray values derived at the scanner, before a halftoning circuit quantizes the gray values for printing. The TRC correction circuit includes at least two stored TRC correction functions that can be applied by the TRC correction signals. In making a call to transmit a document via the facsimile function to a called station, the exchange of signals required for establishing the facsimile connection includes identification of a preferred TRC correction function preparatory to printing at the called station printer. In accordance with the identification of a preferred TRC correction function, the image processing circuit operates on image signals derived at the scanner, to provide TRC correction of the image signals preparatory to printing at the destination printer.

15 Claims, 4 Drawing Sheets

FACSIMILE WITH LOCAL CORRECTION OF TRC BASED ON DESTINATION TRC REQUIREMENTS

The present invention is directed to a multifunctional device having a facsimile function, and including the capability of processing image signals generated thereby for TRC correction, responsive to information about the destination facsimile function print engine.

BACKGROUND OF THE INVENTION

Standard facsimile devices which operate only as facsimile machines connected directly to a telephone line are rapidly being replaced by devices which combine facsimile and/or digital scanning, copying and printing in one single unit. Note, e.g., U.S. Pat. Nos. 4,947,345 to Paradise; 3,597,071 to Jones; 5,038,218 to Matsumoto; 5,021,892 to Kita, et al.; and 4,623,244 to Andrews, et al. One class of these devices may conveniently be directly connected to a personal computer or workstation to provide printing, and to a telephone access line to provide facsimile transmission and receipt.

It is well known that control of the Tone Reproduction Curve (TRC) for a system can improve printing quality. In a standard document processing system, scanner and printer characteristics are known. Based on these factors, TRC is adjusted so that an incremental change in gray scale value of the image signal causes a similar change in the gray scale response at a printer. Typically this may be accomplished with a Look up Table (LUT) stored in a memory that maps gray value image signals from the system (typically from the scanner) to printer signals suitable for driving the printer. Other methods of accomplishing this function are well known. For a further discussion of TRC correction, note *Digital Document Processing* by H. Hou, John Wiley and Sons, 1983, pp. 100–103.

Facsimile devices present an unusual case in TRC correction, in that information about the ultimate printer driven by the image signals is typically not available. Destination devices (including multifunction machines) may include xerographic printers, thermal transfer printers, thermal paper printers, ink jet printers, etc. In standard practice, each of these printers would require a distinct TRC correction. While every printer model (in fact, every printer) might have a distinctive TRC, fortunately, each type of printer is broadly similar, e.g. ink jet printers have a TRC with a set of common characteristics. For facsimile transmission, a default TRC curve is assumed.

Facsimile protocols allow non standard facilities (NSF) or functions to be defined. Assuming that a calling fax and a called fax have a common NSF function, they can take advantage of proprietary features, even though not part of the CCITT standards protocols. See, Recommendation T.30 "Procedures for Document Facsimile Transmission in the General Switched Telephone Network", Melbourne 1988 (ITU). This is a commonly used practice for other functions such as compression.

References disclosed herein are incorporated by reference for their teachings.

SUMMARY OF THE INVENTION

The present invention is directed to a multifunctional device having a facsimile function, and including the capability of processing image signals generated thereby for TRC correction, responsive to information about a destination facsimile function print engine.

In accordance with one aspect of the invention, a document processing device including at least a facsimile function, a scanner and an image processing circuit is provided. The image processing circuit includes a circuit for applying a TRC correction to gray values derived at the scanner, before a halftoning circuit quantizes the gray values for printing. The TRC correction circuit includes at least two stored TRC correction functions that can be applied by the TRC correction. In making a call to transmit a document via the facsimile function to a called station, the exchange of signals required for establishing the facsimile connection includes identification of a preferred TRC correction function preparatory to printing at the called station printer. In accordance with the identification of a preferred TRC correction function, the image processing circuit operates on image signals derived at the scanner, to provide TRC correction of the image signals preparatory to printing at the destination printer.

In accordance with another aspect of the invention, the facsimile function makes use of the NSF facility in the Group 3 facsimile handshake protocol to identify whether the called machine can provide an identification required to adjust TRC.

In accordance with yet another aspect of the invention, the identification of a preferred TRC correction function takes the form of an indication of print engine technology, whereby, for destination printers employing a particular printing technology, a predetermined TRC correction function is applied.

In accordance with still another aspect of the invention, the identification of a preferred TRC correction function best suited for a called machine may be selected at a calling machine, if known, via a user interface or by a look up table stored in memory mapping telephone numbers to preferred TRC functions.

These and other aspects of the invention will become apparent from the following description, the description being used to illustrate a preferred embodiment of the invention when read in conjunction with the accompanying drawings in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
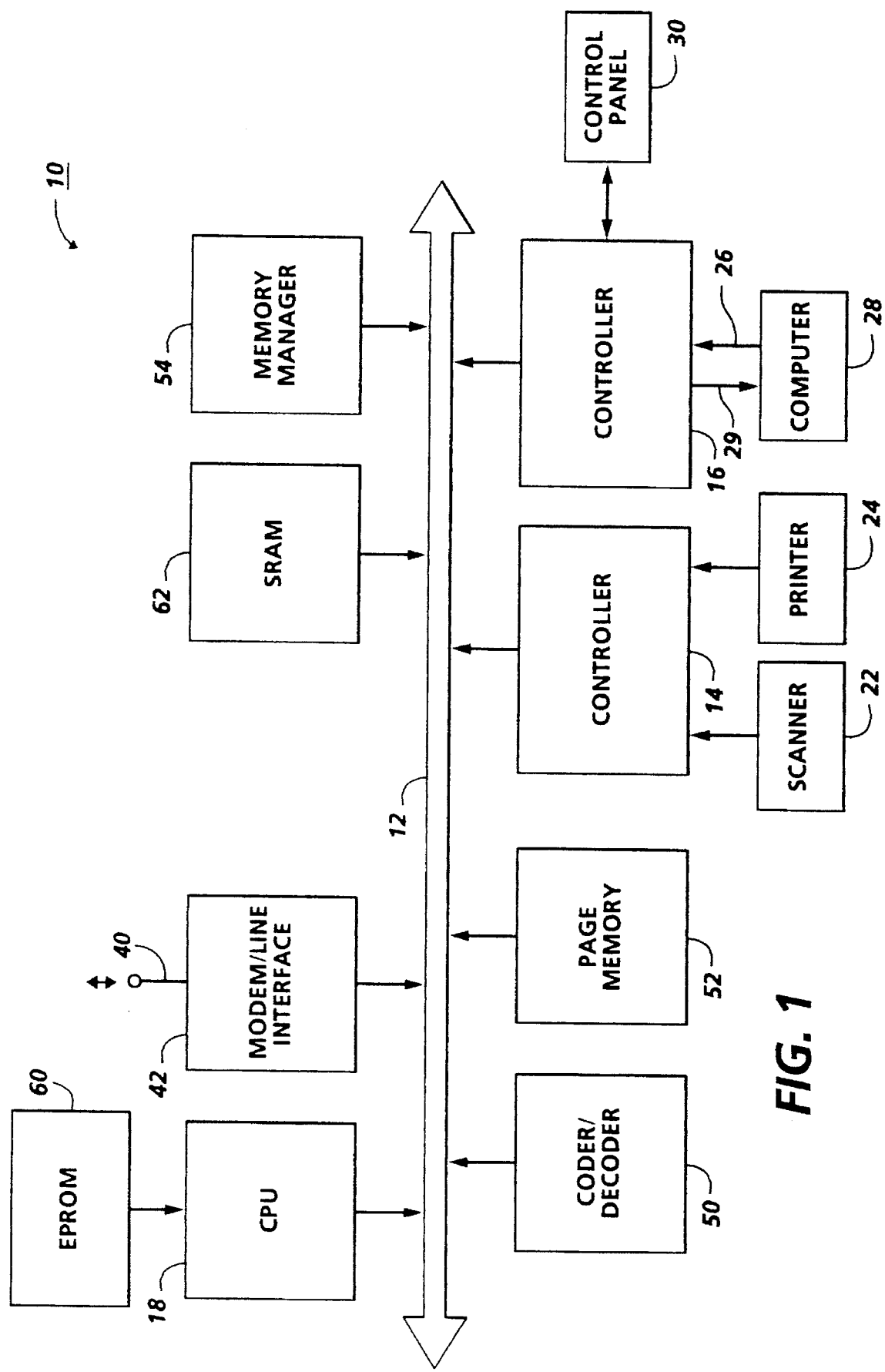
FIG. 1 is a block diagram depicting a multifunctional document processing system.

Referring to FIG. 1, a multifunctional document processing system is referenced generally as numeral 10. A system bus 12 provides for communication between components. Device control is distributed between two programmable controllers, hereinafter first controller 14 and second controller 16. A central processing unit (CPU) 18 includes a third programmable controller server to provide control of the overall system processing. Scanner 22 and printer 24 are connected to the system via first controller 18. The printer 24, generates the hard copy required. In one embodiment, this printer is an ink jet printer. Scanner 22 is included to provide full facsimile and/or copier functions. The system is operative to process electronic document signals directed thereto via second controller 16 by serial, parallel or SCSI connection 26 from an external personal computer or workstation 28. Second processor 16 may support an additional outward connection 29 from the system to the personal computer 28 for passing scanned data thereto. Second controller 16 additionally provides control for a user interface/control panel (UI) 30 for the system. Second controller 16 also receives the outputs of the systems machine sensors, and provides control of the mechanical components of the system, and particularly the paper transport systems. It will no doubt be appreciated that instead of a personal computer, a network connection or network server could be substituted, to provide network operation, or that the required functionality could be included in the multi-function device.

Facsimile communication is provided for system 10 via a telephone line 40 and fax modem 42. Decoding and encoding of facsimile transmissions is provided by coder/decoder 50. Page memory 52 may be provided, having storage capability for storing electronic document signals corresponding to at least several pages. Conveniently, it may be DRAM-type memory. Access to the memory is controlled by memory manager 54, which in turn is controlled by CPU 18.

Programming information is stored in EPROM 60, and SRAM 62.

One possible embodiment of the invention allows the use of CPU 18 to control access to a data bus 12, on which image information and control information flow. In such an arrangement, a facsimile transmission can be received by the document process system 10 at telephone line 40 and fax modem 42, and directed either directly to printer 24, via first controller 14, or to page memory 52. Information stored at page memory 52 can be directed to printer 24 or to computer 28. Information from computer 28 can be directed via connection 26 to second controller 16 to either page memory 52 or printer 24. Scanned data from scanner 22 can be directed via first controller 14 either to page memory 52 (which is particularly useful in the case of precollation) or to printer 20. Image output can occur either at a printer, or a display, perhaps associated with computer 28.

Figure 2:
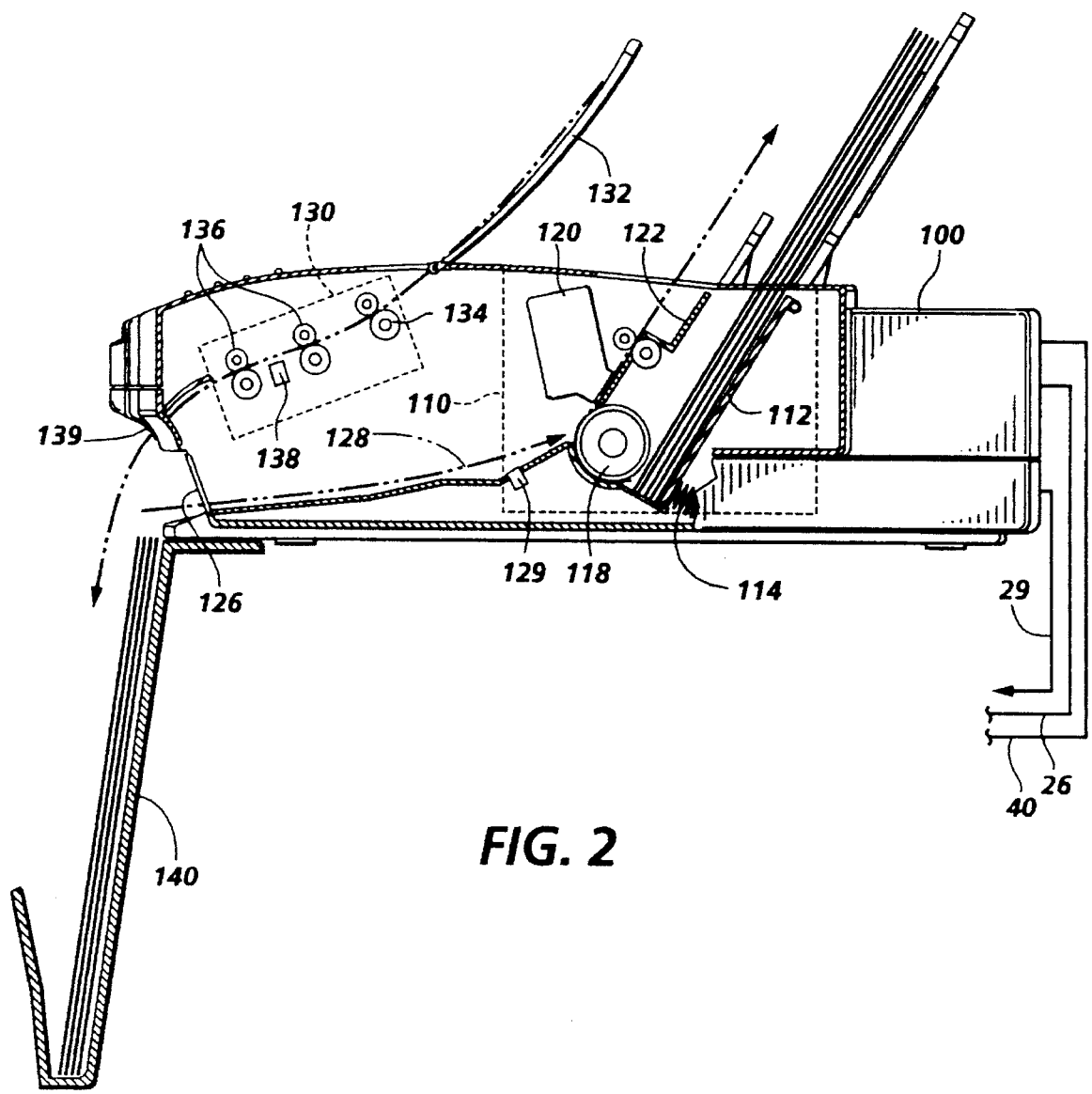
FIG. 2 is a schematic view of a multifunctional document processing device contemplated to incorporate the present invention.

With reference now to FIG. 2, a highly simplified and schematic view of a machine capable of incorporating the described invention is illustrated. Within housing 100 is supported the circuits described in FIG. 1, a scanner, printer, paper transports and appropriate connections to external functions. Within dotted line 110 are illustrated the mechanical elements of printer 24. Included are input paper tray 112, with an appropriate tray elevator 114. For printing, sheets are fed from tray 112 by a roll feeding arrangement 118, which advances sheets from the tray. As the sheet is wrapped past feed roller 118, an ink jet printing system 120 deposits ink in image configuration a swath at a time. Further details with respect to thermal ink jet printing devices are available at U.S. Pat. No. 4,638,337 to Torpey et al., and U.S. patent application Ser. No. 08/081,898 entitled, "Method and Apparatus for Maintaining Constant Drop Size Mass in Thermal Ink Jet Printers," by J. Stephany which illustrate a multi-color ink jet printer. Upon completion of printing, the documents continue to advance until they are deposited in output tray 122.

For printing on stock which is not suitable for stacking in input paper tray 112, a bypass path is provided, entering the machine at bypass entry 126. A sheet path 128 is defined by paper guides (not shown). In this embodiment, stock is manually inserted until it is engaged at the feed roller 118. A sensor 129, senses the presence of bypass stock and signals controller 16 (FIG. 1) to start operation of the feed roller for advancing the stock past the printer.

Within the dotted line 130, are illustrated the mechanical components of the scanner 22. Included are input document tray 132, with retard feeder 134, feeding documents seriatim from tray 132. Documents are advanced to CVT arrangement 136, whereat the documents will be pass a full width scanning element, with appropriate illumination and optics, indicated generally by 138. The scanned documents are directed to an exit 138, from which they are gravity stacked in an output document tray 140.

Figure 3:
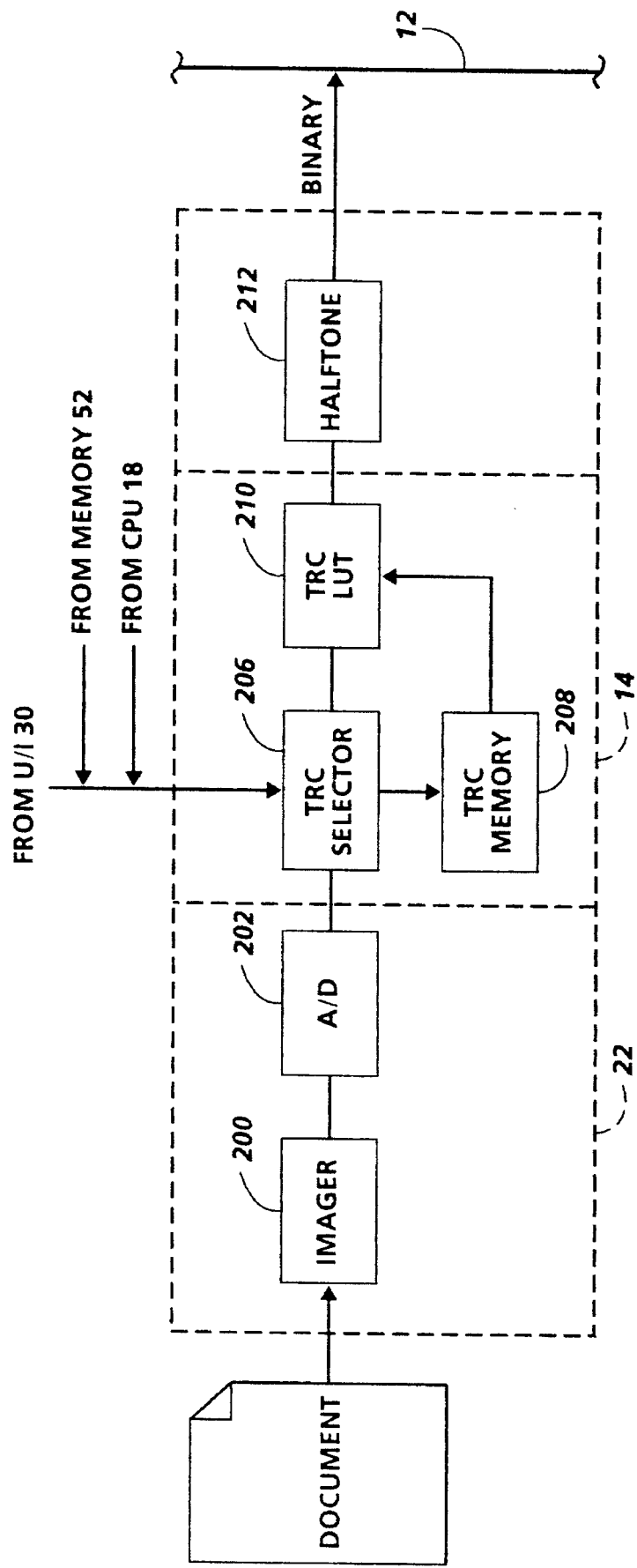
FIG. 3 is a block diagram of the scanner in the described multifunction document processing device, incorporating a selectable TRC function.

With reference now to FIG. 3, documents are scanned by the scanner 22, which includes an imager 200, typically a linear array of photosensitive elements such as CCD's, and an analog to digital converter 202. Image signals directed out from the scanner are accordingly digital gray values. As used herein, the term "gray" refers to pixel values between 0 and 255. It does not refer to the color gray, and in fact, may represent values of pixels in one or more separations together forming a color image. Typically such signals are 8 bit values, allowing 256 possible gray levels. Scanner 22 is operatively connected to controller 14, which will typically be a collection of ASIC's, one of which will support image processing. The image processing ASIC will include a circuit for TRC selection 206, a TRC memory 208, and a TRC LUT 210. Upon an indication of the output printer type, TRC selector 206 identifies in TRC memory 208 an appropriate TRC function. That function is stored for processing the image in TRC LUT 210. Uncorrected gray level values are input to the TRC LUT 210 and corrected gray level values are output. The output gray level values are halftoned at halftoning circuit 212, so that the gray values placed in suitable binary form for printing are output to bus 12.

Selection parameters are set in a number of ways. At UI 30, control signals can be directly generated, directing TRC selector 206 to select a desired TRC function. Alternatively, control signals can be indirectly generated, via a mapping in memory of phone numbers to TRC functions, the mapping derived by manual programming, or stored from previous calls made to the phone number, and directing TRC selector 206 to select a desired TRC function. Additionally, during the facsimile handshake, a control signal can be received (via CPU 18) from a destination facsimile transmission, received at modem/line interface 42.

Figure 4:
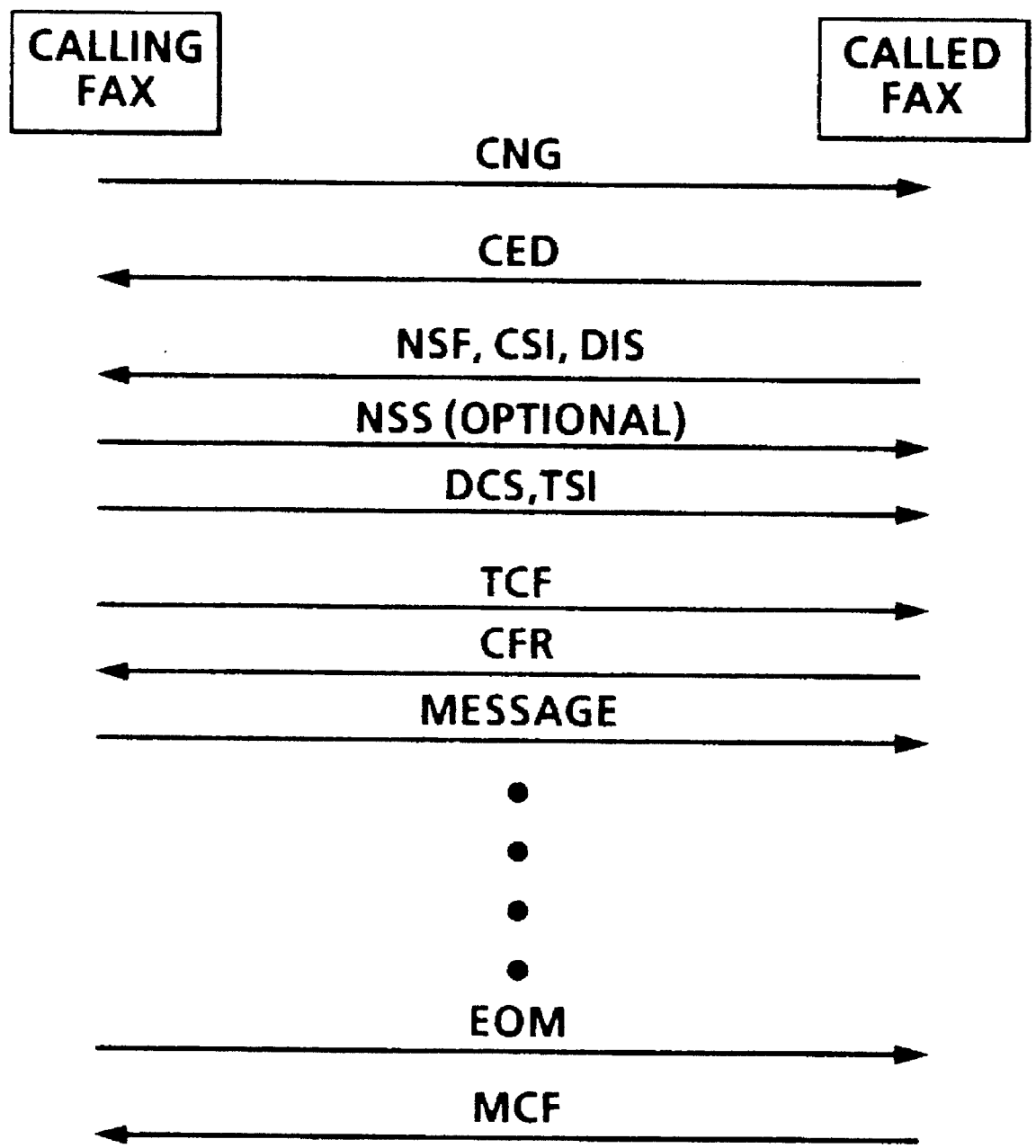
FIG. 4 illustrates the NSF function usage in a facsimile protocol.

In one embodiment of the invention, the selection of TRC occurs at the facsimile handshake, specified by Recommendation T.30. FIG. 4 illustrates one of many possible handshakes, with this particular handshake corresponding to a standard automatic call/automatic answer where the calling station wishes to make a transmission. A calling facsimile commenced the transaction with a CNG signal, indicating to the receiver that a facsimile machine is making a call. The called facsimile responds with a CED signal, indicating that a facsimile machine has answered. The called machine further responds with a DIS signal (capability identification), a CSI signal (called station identification) and an NSF signal (indicating the possibility of non-standard functions. It is in this field that the type of machine can be identified. The identification may take many forms including: 1) identification of printing technology; 2) identification of model or manufacturer (who may have prespecified TRC curves useful for their machine); or 3) identification of preferred TRC function. While it is preferred that the embodiment comply with current standard facsimile protocols, it is entirely possible that a new standard or a proprietary protocol could be used so that during some sequence of the handshake, the actual TRC function itself could be transmitted The handshake is continued, with an optional NSS signal confirming the NSF function, a DCS signal confirming the setup responsive to the DIS signals, and a TSI signal identifying the calling station. A TCF signal follows to confirm the completion of training, and a CFR signal indicates readiness to receive. The message follows. At the end of the message an EOM is sent, and if the transmission is successful, an MCF signal confirms the success.

It will no doubt be appreciated that the multifunctional aspects of this embodiment can be combined into a single housing, or can be the combination of several directly connected but separate components, or can be the combination of several indirectly connected or perhaps network-connected separate components.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A document processing system including at least scanning and facsimile functions, and comprising:
   a scanner producing digital gray signals representing a document scanned thereby;
   a facsimile modem, sending and receiving communications from a called facsimile device, said communications:
      a) identifying a preferred tone reproduction curve for printing the digital gray signals at the called facsimile device to the calling device, and
      b) transmitting image signals representing the scanned document with preferred tone reproduction curve correction from the calling device to the called device;
   an image processing circuit including:
      a tone reproduction curve correction circuit including
         a first memory storing at least two tone reproduction curve functions,
         a look up table stored in a second memory, mapping digital gray input values from said scanner to corrected digital gray output values,
         a tone reproduction curve selector, operative to load stored tone reproduction curve functions from said first memory to said look up table in said second memory responsive to a tone reproduction curve selection command;
      a halftoning circuit, reducing the number of bits defining each digital gray signal to a number suitable for facsimile communication; and
   a controller, producing tone reproduction curve selection commands responsive to identified preferred tone reproduction functions.

2. The device as defined in claim 1, wherein said digital gray signals are 8 bit signals representing 256 levels of gray.

3. The device as defined in claim 1, wherein said facsimile modem receives, as part of said communications, an NSF signal from said called facsimile device, identifying a preferred tone reproduction curve for printing the digital gray signals at the called facsimile device.

4. The device as defined in claim 1, wherein said identification of a preferred tone reproduction curve for printing the digital gray signals at the called facsimile device identifies a print engine type of the called facsimile device.

5. The device as defined in claim 1, wherein said identification of a preferred tone reproduction curve for printing the digital gray signals at the called facsimile device identifies a machine model of the called facsimile device.

6. The device as defined in claim 1, wherein said controller generates a default TRC function selection command if the identified preferred TRC function fails to identify a known TRC function.

7. A method of improving the reproduction of facsimile transmitted documents in a document processing system including at least scanning and facsimile functions, comprising the steps:
   scanning a document to produce digital gray signals representing a document scanned thereby;
   sending and receiving communications with a called facsimile device;
   processing the digital gray signals preparatory to transmission by:
      correcting the tone reproduction curve characteristics using the steps of:
         storing at least two tone reproduction curve functions,
         selecting a stored tone reproduction curve function responsive to a tone reproduction curve selection command;
         mapping digital gray input values from said scanner to corrected digital gray output values using said selected tone reproduction curve function,
      halftoning the corrected digital gray output values, reducing the number of bits defining each digital gray signals to a number suitable for facsimile communication; and
   controlling tone reproduction curve selection, by generating commands to selected stored tone reproduction curve functions, responsive to an identified preferred TRC function;
   entering a telephone number controlling the facsimile modem at a user interface; and
   storing a look up table in device memory mapping telephone numbers called to identified preferred TRC functions corresponding to destination printers at said telephone numbers, said look up table identifying preferred TRC functions to said controller responsive to telephone numbers entered at said user interface.

8. The method as defined in claim 7, including the step of storing a look up table mapping telephone numbers called to TRC functions, and generating selection commands responsive to telephone numbers dialed has mappings entered for each telephone call made.

9. A document processing system including at least scanning and facsimile functions, and comprising:
   a scanner producing digital gray signals representing a document scanned thereby;
   a facsimile modem, sending and receiving communications from a called facsimile device;
   an image processing circuit including:
      a tone reproduction curve correction circuit including
         a first memory storing at least two tone reproduction curve functions,
         a look up table stored in a second memory, mapping digital gray input values from said scanner to corrected digital gray output values, a tone reproduction curve selector, operative to load stored tone reproduction curve functions from said first memory to said look up table in said second memory responsive to a tone reproduction curve selection command;

a halftoning circuit, reducing the number of bits defining each digital gray signal to a number suitable for facsimile communication; and a controller, producing tone reproduction curve selection commands responsive to an identified preferred TRC function including a user interface at which telephone number controlling the facsimile modem may be entered; and a device memory, storing a look up table mapping telephone numbers called to identified preferred TRC functions corresponding to destination printers at said telephone numbers, said look up table identifying preferred TRC functions to said controller responsive to telephone numbers dialed at said user interface.

10. The device as defined in claim 9, wherein said device memory, storing a look up table mapping telephone number called to TRC functions, and generating selection commands responsive to telephone numbers dialed has mappings entered for each telephone call made.

11. A method of improving the reproduction of facsimile transmitted documents in a document processing system including at least scanning and facsimile functions, comprising the steps:

scanning a document to produce digital gray signals representing a document scanned thereby;

sending and receiving communications with a called facsimile device, said communications:

a) identifying a preferred tone reproduction curve for printing the digital gray signals at the called facsimile device to the calling device, and b) transmitting image signals representing the scanned document with preferred tone reproduction curve correction from the calling device to the called device;

processing the digital gray signals preparatory to transmission by:

correcting the tone reproduction curve characteristics using the steps of:

storing at least two tone reproduction curve functions, selecting a stored tone reproduction curve function responsive to a tone reproduction curve selection command;

mapping digital gray input values from said scanner to corrected digital gray output values using said selected tone reproduction curve function, halftoning the corrected digital gray output values, reducing the number of bits defining each digital gray signals to a number suitable for facsimile communication; and controlling, tone reproduction curve selection commands responsive to communications from a called facsimile device.

12. The method as defined in claim 11, wherein said digital gray signals are 8 bit signals representing 256 levels of gray.

13. The method as defined in claim 11, wherein as part of said communications, an NSF signal from said called facsimile device, identifying a preferred tone reproduction curve for printing the digital gray signals at the called facsimile device.

14. The method as defined in claim 11, wherein said identification of a preferred tone reproduction curve for printing the digital gray signals at the called facsimile device identifies a print engine type of the called facsimile device.

15. The method as defined in claim 11, wherein said identification of a preferred tone reproduction curve for printing the digital gray signals at the called facsimile device identifies a machine model of the called facsimile device.

\* \* \* \* \*